United States Patent Office 3,293,219
Patented Dec. 20, 1966

3,293,219
POLYACETAL TERPOLYMERS CONTAINING RANDOMLY RECURRING GROUPS DERIVED FROM A METHYLENE-BIS-(4-OXYMETHYL-1,3-DIOXOLANE)
Roy T. Gottesman, Glen Rock, Henri Sidi, Paramus, and Robert Hood Barth, Ridgefield, N.J., assignors, by mesne assignments, to Tenneco Chemicals, Inc., a corporation of Delaware
No Drawing. Filed July 10, 1963, Ser. No. 294,178
5 Claims. (Cl. 260—67)

This invention relates to formaldehyde copolymers and, more particularly, to a new class of high molecular weight copolymers of formaldehyde and certain triformals, as well as to the process by which these copolymers are prepared. These new copolymers are particularly suitable for molding applications, and may be fabricated into films, filaments, fibers, rods and tubes.

The new class of copolymers has been prepared by copolymerizing formaldehyde with methylene - bis - (4-oxymethyl-1,3-dioxolane), which is a new triformal having a structure represented by the formula

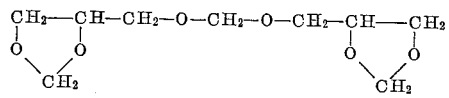

Structurally, these new copolymers contain recurring oxymethylene (—OCH$_2$—) groups interspersed with recurring groups derived from methylene-bis-(4-oxymethyl-1,3-dioxolane) and having the structure

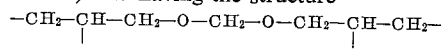

Exclusive of the terminal groups and of any branching which may be caused by the particular solvents or catalysts employed in the copolymerization reaction, the probable structure of these new copolymers may be represented by the formula

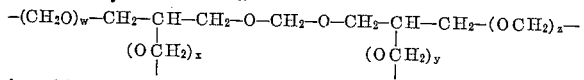

in which $w$, $x$, $y$ and $z$ represent integers denoting recurring oxymethylene groups. The branched chains of the copolymer molecule may be terminated by hydroxyl groups, by ether groups, by carboxylate groups, by cyanoethyl groups, or by other end groups. Alternatively, two or more of these branched chains may be joined to form cross-linked molecules.

Methylene-bis-(4 - oxymethyl-1,3-dioxolane), which is used as the comonomer in the preparation of the copolymers of the invention, is a new triformal obtained by reacting 2 moles of 4-hydroxymethyl-1,3-dioxolane (glycerol cyclic monoformal) with 1 mole of formaldehyde or a compound which readily forms formaldehyde, such as paraformaldehyde or α-polyoxymethylene, in the presence of an acidic catalyst. The triformal may be separated from the reaction mixture by distillation under vacuum and used without further purification in the copolymerization reaction. Although the invention contemplates the copolymerization of methylene-bis-(4-oxymethyl-1,3-dioxolane) with formaldehyde to form moldable copolymers, similar copolymers may also be obtained by using methylene-bis-(4-substituted-4-oxymethyl-1,3-dioxolanes) as the comonomer. These include, by way of illustration, methylene-bis-(4-methyl-4-oxymethyl-1,3-dioxolane), methylene - bis-(4-ethyl-4-oxymethyl-1,3-dioxolane), and methylene-bis-(4-hydroxymethyl-4-oxymethyl-1,3-dioxolane), all of which compounds are fully equivalent to methylene-bis-(4-oxymethyl-1,3-dioxolane) in the preparation of copolymers with formaldehyde in accordance with the invention.

A wide range of molar proportions of the triformal may be incorporated in the copolymer, depending upon the particular properties which are desired in the resultant copolymer. By way of illustration, particularly satisfactory molding properties may be obtained in those copolymers having a molecular weight in the range between about 10,000 and about 100,000 and containing from about 0.1 to about 15 percent by weight and, preferably, from about 0.2 to about 2 percent by weight of recurring groups derived from the triformal.

The monomeric formaldehyde used in the preparation of these copolymers may be derived from the pyrolysis of paraformaldehyde, trioxane, α-polyoxymethylene, or a hemiformal, such as cyclohexanol hemiformal. To obtain polymer products having the desired properties, however, the monomeric formaldehyde should be substantially anhydrous, that is, contain less than 0.5 percent and preferably less than 0.1 percent by weight of water.

The copolymerization of monomeric formaldehyde and methylene-bis-(4-oxymethyl-1,3-dioxolane) may be conducted at a temperature in the range from about 0° C. to about 80° C. (and preferably from 10° C. to 40° C.) in the presence or in the absence of a formaldehyde polymerization initiator, which functions to catalyze the copolymerization reaction. When used, the formaldehyde polymerization initiator is generally employed in an amount in the range from about 0.001 to about 5 percent and, preferably, from 0.01 to 0.5 percent by weight, based on the weight of monomeric formaldehyde which undergoes reaction, using reaction temperatures in the range from about 10° C. to about 40° C.

Any of the well known formaldehyde polymerization initiators can be used in this process including aliphatic amines, hydroxypolyamines, phosphines, arsines, stilbenes, organometallic compounds, and boron trifluoride compounds. Excellent results have been obtained using as initiator boron trifluoride or a boron trifluoride coordinate complex with an organic compound in which oxygen or sulfur is the donor atom. The coordinate complex of boron trifluoride may be, for example, a complex with an alcohol, a phenol, an acid, an ether, an acid anhydride, an ester, a ketone, an aldehyde, a dialkyl sulfide, or a mercaptan. Particularly useful as initiators are boron trifluoride diethyl etherate and boron trifluoride di-n-butyl etherate. Another preferred group of formaldehyde polymerization initiators are cielates of such polyvalent metals as copper, zirconium, zinc, and iron. The chelating agents that may be used include 8-hydroxyquinoline, malonic acid, citraconic acid, N,N-dialkylethylene diamines, o-phenanthroline, phenylalanine, ethylenediamine tetracetic acid, salicylaldehyde, benzoin oxime, dimethylglyoxime, and particularly acetylacetone and similar β-diketones, the use of which latter chelates is described in the copending application of Richard E. Reynolds, Serial No. 293,843, filed July 9, 1963.

The copolymerization of monomeric formaldehyde and methylene-bis-(4-oxymethyl-1,3-dioxolane) is usually carried out in a reaction medium which remains liquid under the polymerization conditions employed. Suitable reaction media include hydrocarbons containing 3 to 10 carbon atoms per molecule, such as propane, hexane, decane, cyclohexane, toluene, xylene, and decahydronaphthalene; esters, such as methylene diacetate and methylene dipropionate (the use of both of which is described in the copending application of Henri Sidi, Serial No. 133,783, filed August 25, 1961, now United States Letters Patent No. 3,219,630); hydrocarbon halides; and ethers. As a general rule, the amount of the reaction medium used is within the range of 1 part to 1000 parts and in most cases 1 part to 100 parts by weight per part by weight of the comonomers.

The copolymerization reaction may be carried out in any convenient manner. For example, anhydrous monomeric formaldehyde may be introduced into a reactor containing the reaction medium, the triformal, and the formaldehyde polymerization initiator. Alternatively, the formaldehyde polymerization initiator may be added to a mixture of the comonomers in the reaction medium or the formaldehyde, triformal, and formaldehyde polymerization initiator may be added simultaneously to the reaction medium. In either case, copolymerization reaction may be carried out as a batchwise process or as a continuous process.

In addition to recurring oxymethylene groups and the recurring groups derived from methylene-bis-(4-oxymethyl-1,3-dioxolane), the new polymers of the invention may also contain other recurring structural groups, particularly oxyalkylene groups having at least two carbon atoms, in which event the resultant polymer is a terpolymer. Oxyethylene and substituted oxyethylene groups are especially desirable and may be incorporated into the polymer structure by including in the reaction mixture the desired amount of a cyclic ether having the structure

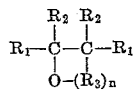

in which $R_1$ and $R_2$ represent hydrogen atoms, alkyl groups having from 1 to 3 carbon atoms, or halogen substituted alkyl groups having from 1 to 3 carbon atoms; $R_3$ represents methylene, oxymethylene, lower alkyl or haloalkyl substituted methylene, oxymethylene, lower alkyl or haloalkyl substituted oxymethylene groups; and $n$ represents an integer in the range of zero to three. Illustrative of these cyclic ethers are ethylene oxide and 1,3-dioxolane. The oxyethylene groups may comprise from about 0.1 to about 15 percent and, preferably, from 0.2 to 2 percent by weight of the weight of the terpolymer. When oxyethylene groups are incorporated in the polymer structure, then the combined weight of the oxyethylene groups and the groups derived from methylene-bis-(4-oxymethyl-1,3-dioxolane) should not exceed 20 percent of the weight of the terpolymer.

The formation of the polymers (copolymers and terpolymers) of the present invention is best effected under non-oxidizing conditions. A convenient way of obtaining such conditions involves sweeping the reactor with a dry inert gas, such as nitrogen, and carrying out the copolymerization under a blanket of the inert gas. In addition an antioxidant may be present during the reaction and/or may be added to the product to reduce oxidative effects. Among the antioxidants that are useful for this purpose of phenothiazine, 2-mercapto-benzimidazole, diphenylamine, phenyl-α-naphthylamine, bis-(β-naphthylamino)-p-phenylenediamine, 4,4'-butylene-bis-(3-methyl-6-t-butylphenol), and 5-ethyl-10,10-diphenylphenazasiline. The amount of antioxidant used is approximately 0.01 percent to 1 percent based on the weight of the comonomers.

To prevent degradation of the copolymer resulting from prolonged contact with the polymerization initiator, it is generally desirable to remove or neutralize the initiator upon completion of the polymerization step. When boron trifluoride or a boron trifluoride coordinate complex is used as the initiator, the reaction mixture may be treated with an alkaline material, for example, an aliphatic amine, such as tri-n-butylamine, or an alkali metal salt of an alkanoic acid having from 1 to 18 carbon atoms, to neutralize the initiator. Other initiators may be removed by washing the reaction mixture with water or a suitable organic solvent.

Because improved thermal stability of the copolymer or terpolymer may be obtained by "capping" the terminal hydroxyl groups of the copolymer or terpolymer molecules, it is frequently desirable (though not essential) to chemically stabilize the resultant copolymer or terpolymer by acylation, etherification, cyanoalkylation, or other such procedures. By way of illustration, the polymers may be acetylated by heating them with a methylene dicarboxylate, such as methylene diacetate, in the presence of acetic anhydride and an alkaline esterification catalyst, such as sodium acetate.

The following examples are illustrative of the ease with which formaldehyde may be copolymerized with methylene-bis-(4-oxymethyl-1,3-dioxolane) to prepare the new copolymers and terpolymers of the invention:

*Example I*

A mixture of 52 grams of 4-hydroxymethyl-1,3-dioxolane, 15 grams of α-polyoxymethylene, 200 ml. of toluene, and 1 ml. of boron trifluoride di-n-butyl etherate was heated at its reflux temperature (90° C.) for one hour, during which time approximately 6 grams of water and a small amount of a solid white material distilled off and were collected in a Dean-Stark trap. The reaction mixture was distilled under reduced pressure to remove the toluene and approximately 6 grams of unreacted 4-hydroxymethyl-1,3-dioxolane, and then at 114° C./0.5 mm. to 122° C./9 mm. to separate 35 grams of methylene-bis-(4-oxymethyl-1,3-dioxolane).

*Example II*

Anhydrous monomeric formaldehyde was prepared by heating a suspension of 100 grams of α-polyoxymethylene in 600 ml. of mineral oil at 117° C.–150° C. The formaldehyde vapors from this pyrolysis were passed through a series of traps, the first of which was maintained at room temperature, the second at 0° C., and the third and fourth at −15° C. to −22.5° C. The resulting purified anhydrous monomeric formaldehyde was introduced along with a stream of anhydrous nitrogen into a reactor that contained 817 grams of freshly-distilled cyclohexane, 10 ml. of methylene-bis-(4-oxymethyl-1,3-dioxolane), 0.2 gram of 4,4'-butylene-bis-(3-methyl-6-t-butylphenol), and 0.3 ml. of boron trifluoride di-n-butyl etherate. The reaction mixture was stirred vigorously and maintained at a temperature in the range of 24° C. to 28° C. during the addition of the formaldehyde, which took place over a period of two hours. The resultant copolymer was separated from the reaction mixture by filtration and added to a mixture of 1.0 gram of anhydrous sodium acetate and 125 grams of acetic anhydride in 1120 grams of methylene diacetate, which mixture was then heated gradually to 160° C., maintained at a temperature in the range of 160° C. to 165° C. for one hour, cooled slowly to room temperature and filtered. The resulting acetylated copolymer was washed with 500 ml. of acetone, with four 500 ml. portions of water, and finally with two 500 ml. portions of acetone, and then dried under vacuum at 65° C., yielding 130 grams of an acetylated formaldehyde-[methylene-bis-(4-oxymethyl-1,3-dioxolane)] copolymer that had an average molecular weight of approximately 10,000, as determined viscosimetrically.

Vapor phase chromatographic analysis of its hydrolytic degradation products indicated that the copolymer contained 0.48 percent by weight of combined glycerol.

*Example III*

Two hundred grams of α-polyoxymethylene were fed continuously over a period of three hours into a reactor which contained 900 grams of the diethyl ether of diethylene glycol and 4.5 grams of phosphoric acid maintained at a temperature in the range of 140° C. to 160° C. The formaldehyde vapors which were evolved during this pyrolysis were passed through a trap maintained at 0° C.–5° C. and then along with a stream of anhydrous nitrogen into a reactor that contained 1350 grams of cyclohexane; at the same time 13 ml. of a 3% solution of boron trifluoride in cyclohexane and 4 ml. of methylene-bis-(4 - oxymethyl-1,3 - dioxolane) were introduced into the reactor. The reaction mixture was stirred vigorously and maintained at a temperature in the range of 21° C.–26° C. during the addition of the comonomers and the formaldehyde polymerization initiator. The resulting copolymer was separated from the reaction mixture by filtration and added to a mixture of 3 grams of sodium acetate and 200 grams of acetic anhydride in 2115 grams of methylene diacetate. This mixture was heated gradually to 160° C., maintained at a temperature in the range of 160° C. to 165° C. for one hour, cooled slowly to room temperature, and filtered. The acetylated copolymer was washed with 500 ml. of acetone, with four 500 ml. portions of water, and finally with two 500 ml. portions of acetone, and then dried under vacuum at 65° C., yielding 151 grams of an acetylated formaldehyde-[methylene - bis - (4-oxymethyl-1,3-dioxolane)] copolymer that had an average molecular weight of 15,400, as determined viscosimetrically.

*Example IV*

Two hundred grams of α-polyoxymethylene were fed continuously over a period of two hours into a reactor that contained 1100 grams of the diethyl ether of diethylene glycol and 2 grams of phosphoric acid maintained at a temperature of 140° C. to 160° C. The formaldehyde vapors which were evolved from the pyrolytic reaction were passed through the series of traps described in Example II and then along with a stream of anhydrous nitrogen into a reactor that contained 1100 ml. of freshly-distilled cyclohexane and 0.3 ml. of boron trifluoride di-n-butyl etherate at the same time that 10 ml. of 1,3-dioxolane and 10 ml. of methylene-bis-(4-oxymethyl-1,3-dioxolane) were being introduced into the reactor. The reaction mixture was stirred vigorously and maintained at a temperature in the range of 20° C. to 24° C. during the addition of the formaldehyde, 1,3-dioxolane, and methylene - bis - (4-oxymethyl-1,3-dioxolane). The resulting terpolymer was separated from the reaction mixture by filtration and added to a mixture of 1 gram of anhydrous sodium acetate and 125 grams of acetic anhydride in 1120 grams of methylene diacetate. This mixture was heated gradually to 160° C., maintained at a temperature in the range of 160° C. to 165° C. for one hour, cooled slowly to room temperature, and filtered. The resulting acetylated terpolymer was washed with 500 ml. of acetone, with four 500 ml. portions of water, and finally with two 500 ml. portions of acetone, and then dried under vacuum at 65° C. There was obtained 143.5 grams of an acetylated formaldehyde-1,3-dioxolane-[methylene-bis-(4-oxymethyl-1,3-dioxolane)] terpolymer that had an average molecular weight of 24,900, as determed viscosimetrically. Vapor phase chromatographic analysis of its hydrolytic degradation products indicated that the terpolymer contained 0.92 percent by weight of combined glycerol and 0.4 percent by weight of combined ethylene glycol. The thermal degradation rate of the acetylated terpolymer at 222° C. was 3.5 percent by weight per hour.

*Example V*

Two hundred grams of α-polyoxyethylene were fed continuously over a period of two hours into a reactor that contained 1100 grams of the diethyl ether of diethylene glycol and 2 grams of phosphoric acid maintained at a temperature of 140° C. to 160° C. The formaldehyde vapors which were evolved from this pyrolytic reaction were passed through the series of traps described in Example II and then along with a stream of anhydrous nitrogen into a reactor that contained 1100 ml. of freshly-distilled cyclohexane and 0.3 ml. of boron trifluoride di-n-butyl etherate at the same time that 15 ml. of 1,3-dioxolane and 5 ml. of methylene-bis-(4-oxymethyl-1,3-dioxolane) were being introduced into the reactor. The reaction mixture was stirred vigorously and maintained at a temperature in the range of 22° C. to 25° C. during the addition of the formaldehyde, 1,3-dioxolane, and methylene-bis(4-oxymethyl-1,3-dioxolane). The resulting terpolymer was separated from the reaction mixture by filtration and added to a mixture of 1 gram of anhydrous sodium acetate and 125 grams of acetic anhydride in 1120 grams of methylene diacetate. This mixture was heated gradually to 160° C., maintained at a temperature in the range of 160° C. to 165° C. for one hour, cooled slowly to room temperature, and filtered. The resulting acetylated terpolymer was washed with 500 ml. portions of acetone, and then dried under vacuum at 65° C. There was obtained 96.0 grams of an acetylated formaldehyde-1,3 - dioxolane - [methylene - bis-(4-oxymethyl-1,3-dioxolane)] terpolymer that had an average molecular weight of approximately 10,000, as determined viscosimetrically. Vapor phase chromatographic analysis of its hydrolytic degradation products indicated that the terpolymer contained 0.3 percent by weight of combined glycerol and 0.33 percent by weight of combined ethylene glycol. The thermal degradation rate of the acetylated terploymer at 222° C. was 2.7 percent by weight per hour.

We claim:

1. A normally solid, thermally stable, polyacetal terpolymer consisting essentially of (a) randomly recurring oxymethylene groups, (b) from about 0.1 to about 15 percent by weight of randomly recurring oxyalkylene groups derived from a cyclic ether having the structural formula

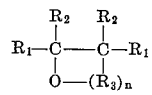

in which $R_1$ and $R_2$ represent members selected from the group consisting of hydrogen atoms, alkyl groups having from 1 to 3 carbon atoms, and halogen-substituted alkyl groups having from 1 to 3 carbon atoms, $R_3$ represents a member selected from the group consisting of methylene, oxymethylene, lower alkyl and haloalkyl-substituted oxymethylene groups, and $n$ is an integer in the range from zero to three, and (c) from about 0.1 to about 15 percent by weight of randomly recurring groups derived from a methylene-bis-(4-oxymethyl-1,3-dioxolane) having the structural formula

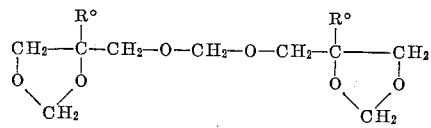

in which R° represents a member selected from the group consisting of hydrogen atoms, lower alkyl and hydroxy-substituted alkyl groups, the polyacetal terpolymer being characterized by a viscosimetrically determined average molecular weight in the range from 10,000 to 100,000.

2. A normally solid, thermally stable, polyacetal terpolymer consisting essentially of (a) randomly recurring oxymethylene groups, (b) from about 0.1 to about 15 percent by weight of randomly recurring oxyethylene groups, and (c) from about 0.1 to about 15 percent by weight of randomly recurring groups derived from methylene-bis-(4-oxymethyl-1,3-dioxolane), the polyacetal terpolymer being characterized by a viscosimetrically determined average molecular weight in the range from 10,000 to 100,000.

3. A normally solid, thermally stable, polyacetal terpolymer consisting essentially of (a) randomly recurring oxymethylene units, (b) from about 0.2 to about 2 percent by weight of randomly recurring oxyethylene groups, and (c) from about 0.2 to about 2 percent by weight of randomly recurring groups derived from methylene-bis-(4-oxymethyl-1,3-dioxolane), the polyacetal terpolymer being characterized by a viscosimetrically determined average molecular weight in the range from 10,000 to 100,000.

4. The compound having the structural formula

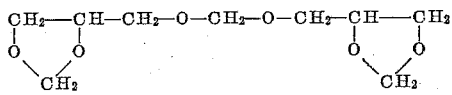

5. The process for the preparation of methylene-bis-(4-oxymethyl-1,3-dioxolane) which comprises reacting 4-hydroxymethyl-1,3-dioxolane with a formaldehyde compound selected from the group consisting of formaldehyde, paraformaldehyde, and α-polyoxymethylene in the presence of an acidic catalyst.

References Cited by the Examiner
UNITED STATES PATENTS 3,027,352   3/1962   Walling et al. _____ 260—67

FOREIGN PATENTS 906,514   1/1954   Germany.

OTHER REFERENCES

Kern et al.: Angewandte Chemie, 73, No. 6, pp. 177–186 (March 1961). Note especially pp. 183–185.

Kunststoffe, vol. 53, July 1963, pp. 424–436. English translation available, pp. 11–22.

WILLIAM H. SHORT, *Primary Examiner.*

L. M. MILLER, *Assistant Examiner.*